United States Patent
Peng et al.

(10) Patent No.: US 11,573,303 B2
(45) Date of Patent: Feb. 7, 2023

(54) TIME OF FLIGHT BASED ROTARY SPEED SENSOR WITH EARLY FAULT DETECTION

(71) Applicant: STMicroelectronics, Inc., Coppell, TX (US)

(72) Inventors: Cheng Peng, Plano, TX (US); Xiaoyong Yang, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 545 days.

(21) Appl. No.: 16/719,004

(22) Filed: Dec. 18, 2019

(65) Prior Publication Data

US 2021/0190640 A1    Jun. 24, 2021

(51) Int. Cl.
*G01S 7/00* (2006.01)
*G01S 7/4865* (2020.01)
*G01M 99/00* (2011.01)
*G01S 17/58* (2006.01)

(52) U.S. Cl.
CPC ......... *G01S 7/4865* (2013.01); *G01M 99/004* (2013.01); *G01S 17/58* (2013.01)

(58) Field of Classification Search
USPC ...................................................... 356/5.01
See application file for complete search history.

(56) References Cited

U.S. PATENT DOCUMENTS

| | | | |
|---|---|---|---|
| 4,178,108 A * | 12/1979 | Kane .................. | B41J 1/24 400/74 |
| 7,840,370 B2 | 11/2010 | Kulczyk et al. | |
| 9,863,852 B2 * | 1/2018 | Krishnamoorthy .. | H02H 7/0844 |
| 10,634,794 B2 * | 4/2020 | Yang .................. | G01S 17/933 |
| 2007/0156320 A1 | 7/2007 | Breed et al. | |
| 2009/0177433 A1 * | 7/2009 | Palmer .................. | G01P 3/49 702/145 |
| 2014/0111218 A1 | 4/2014 | Krishnamoorthy et al. | |
| 2017/0371066 A1 * | 12/2017 | Albert .................. | G01S 7/4817 |

(Continued)

FOREIGN PATENT DOCUMENTS

| | | |
|---|---|---|
| CN | 101776921 B | 7/2011 |
| WO | 2015076198 A1 | 5/2015 |

OTHER PUBLICATIONS

Hsiao, Heng-Sheng et al: "Dynamic Analysis Method of Rotating Shaft With Magnetic Pattern," AIP Advances 7, 056620 (2017): https://doi.org/10.1063/1.4973844 (8 pages).

*Primary Examiner* — James R Hulka
(74) *Attorney, Agent, or Firm* — Crowe & Dunlevy

(57) ABSTRACT

Disclosed herein is a system for detecting rotational speed and early failures of an electronic device. The system includes a rotating disk affixed to a rotating shaft of the electronic device. The rotating disk has projections extending from its periphery. A time of flight ranging system determines distance to the projections extending from the rotating disk. Processing circuitry determines a rotational speed of the rotating shaft from the determined distances to the projections extending from the rotating disk, and detects whether the electronic device is undergoing an early failure from the determined distances to the projections extending from the rotating disk. Rotational speed is determined from the time between successive peaks in the determined distances, and early failures (for example, due to wobble of the shaft) are determined where the peaks vary unexpectedly in magnitude.

27 Claims, 8 Drawing Sheets

(56) References Cited

U.S. PATENT DOCUMENTS

| | | | |
|---|---|---|---|
| 2018/0246215 A1* | 8/2018 | Yang | B64D 47/00 |
| 2018/0278693 A1* | 9/2018 | Binder | H04L 67/12 |
| 2019/0193267 A1* | 6/2019 | Peng | B25J 9/1664 |
| 2019/0201137 A1* | 7/2019 | Shelton, IV | G16H 70/20 |
| 2020/0200036 A1* | 6/2020 | Petersen | G01D 5/245 |
| 2020/0294401 A1* | 9/2020 | Kerecsen | G05D 1/0287 |

\* cited by examiner

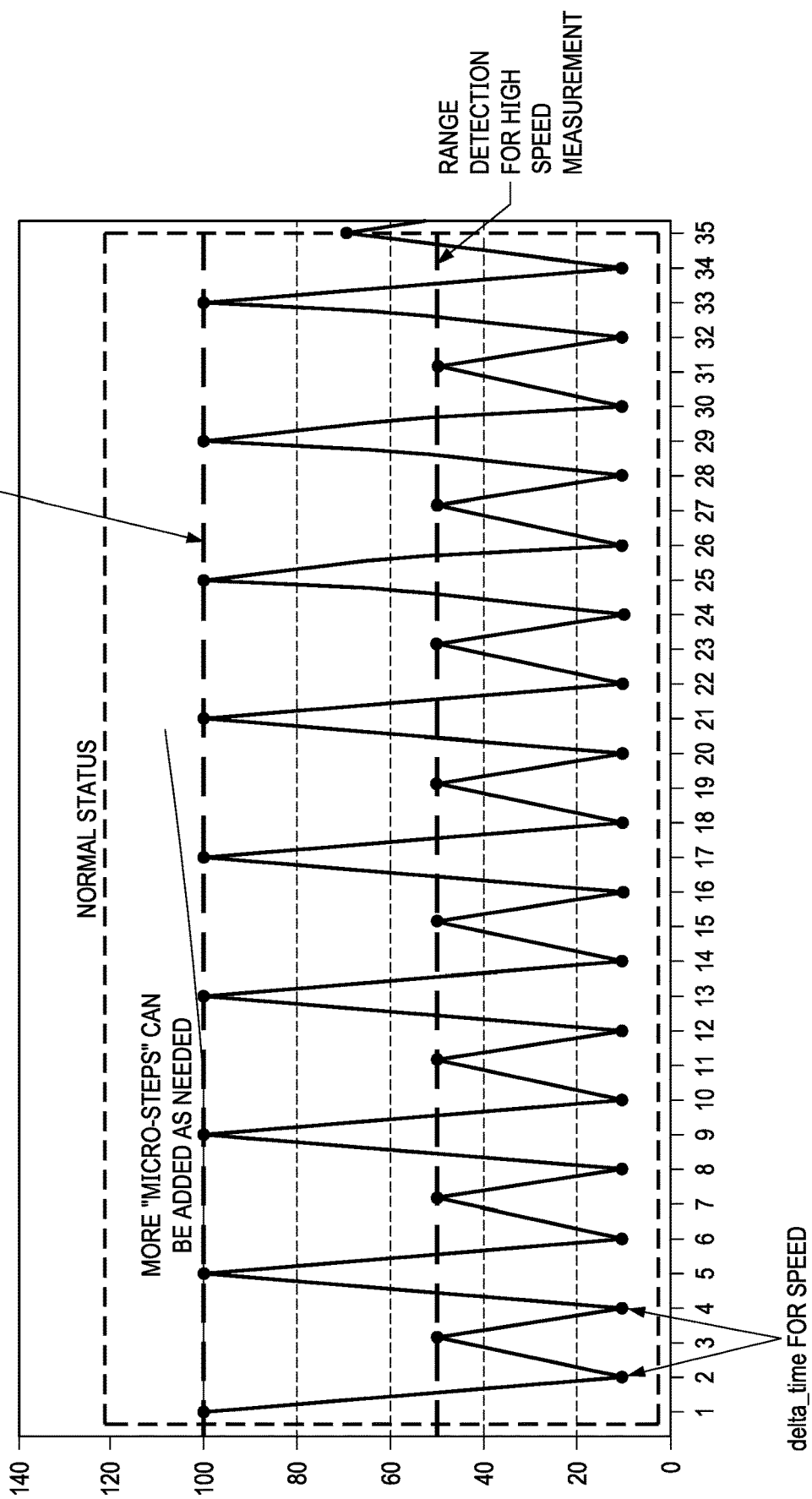

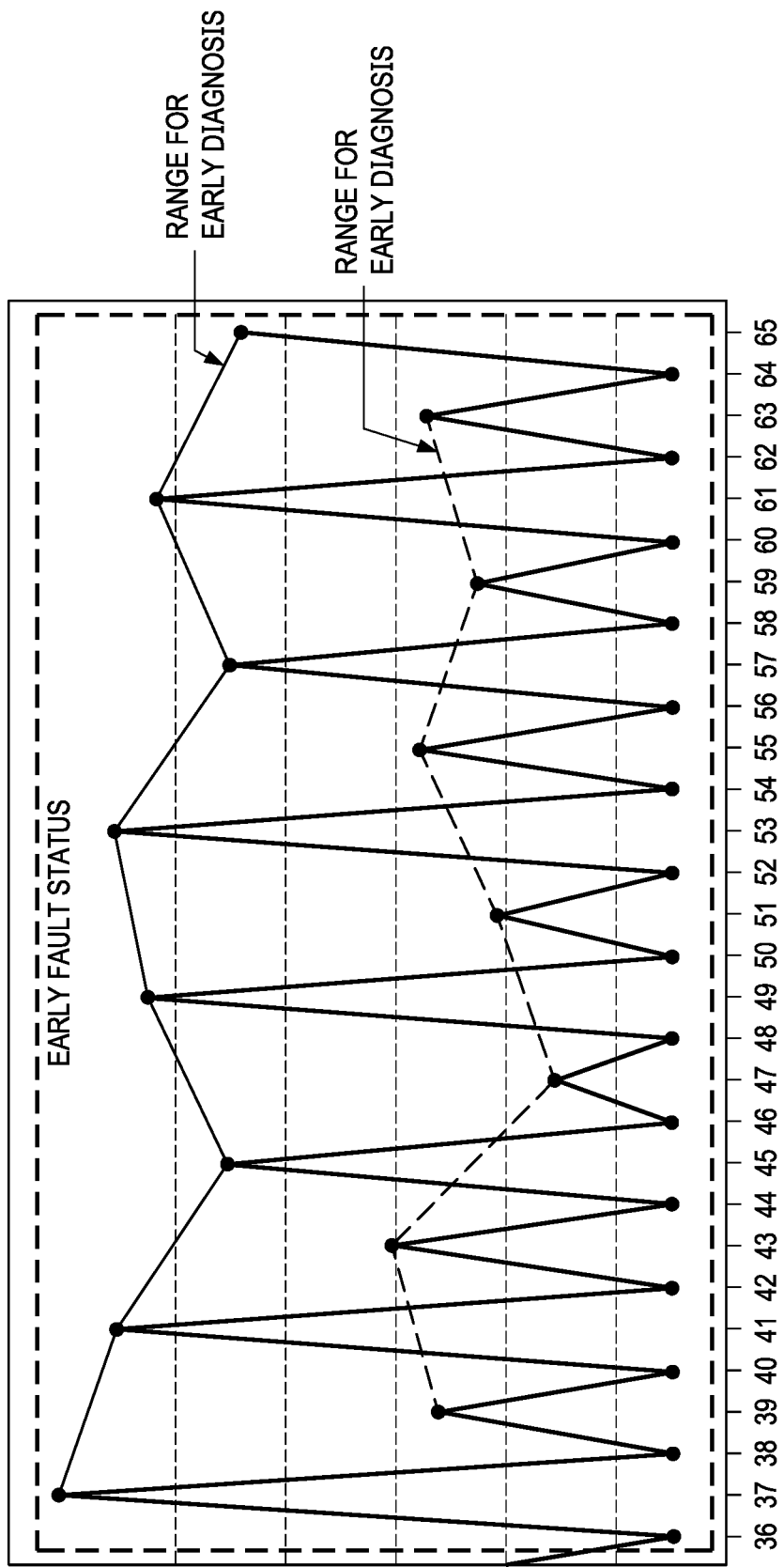

TIME OF FLIGHT BASED ROTARY SPEED SENSOR WITH EARLY FAULT DETECTION

TECHNICAL FIELD

This application is directed to the field of rotary speed measurement, and in particular, to a rotary speed sensor employing time of flight ranging to measure rotary speed as well as early faults with the rotating device.

BACKGROUND

Rotary position and speed sensors are used in a variety of applications, and typically utilize Hall effect based sensors for this determination. However, Hall effect sensors are unable to detect early faults with the rotating device (for example, a wobbling shaft), and therefore an additional sensor is typically employed to provide this early fault detection. This additional sensor is typically an accelerometer used to detect vibrations so as to provide for the early fault detection.

While this approach works, due to the use of two separate sensor types, typically on two separate integrated circuits, this approach is more expensive than desired, and consumes space. As such, there is a need and a desire for a single sensor, such as embodied within a single integrated circuit, capable of both rotary speed detection as well as early fault detection.

SUMMARY

Disclosed herein is a sensor for an electronic device. The sensor includes at least one time of flight ranging system configured to determine distance between the sensor and projections extending from a rotating disk attached to a rotating shaft of the electronic device, and processing circuitry. The processing circuitry is configured to: determine a rotational speed of the rotating shaft from the determined distances between the sensor and the projections extending from the rotating disk; and detect a possible failure condition from the determined distances between the sensor and the projections extending from the rotating disk.

Also disclosed herein is a system for detecting rotational speed and early failures of an electronic device. The system includes: a rotating disk affixed to a rotating shaft of the electronic device, the rotating disk having projections extending from a periphery thereof; at least one time of flight ranging system configured to determine distance to the projections extending from the rotating disk; and processing circuitry. The processing circuitry is configured to: determine a rotational speed of the rotating shaft from the determined distances to the projections extending from the rotating disk; and detect whether the electronic device is undergoing an early failure from the determined distances to the projections extending from the rotating disk.

Also disclosed herein is a method including: determining distance to projections extending from a rotating disk attached to a rotating shaft of an electronic device; determining a rotational speed of the rotating shaft from the determined distances to the projections extending from the rotating disk; and detecting whether the electronic device is undergoing an early failure from the determined distances to the projections extending from the rotating disk.

Also disclosed herein is another sensor for an electronic device. The sensor includes: at least one time of flight ranging system configured to determine distance between the sensor and projections extending from a rotating disk attached to a rotating shaft of the electronic device; and processing circuitry configured to determine a rotational speed of the rotating shaft from the determined distances between the sensor and the projections extending from the rotating disk.

BRIEF DESCRIPTION OF THE DRAWINGS

FIG. 5A is a graph of ranging data showing operation of the integrated circuit of FIG. 1 in both low speed and high speed modes, in the absence of an early fault.

FIG. 5B is a graph of ranging data showing operation of the integrated circuit of FIG. 1 in both low speed and high speed modes, in the presence of an early fault.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
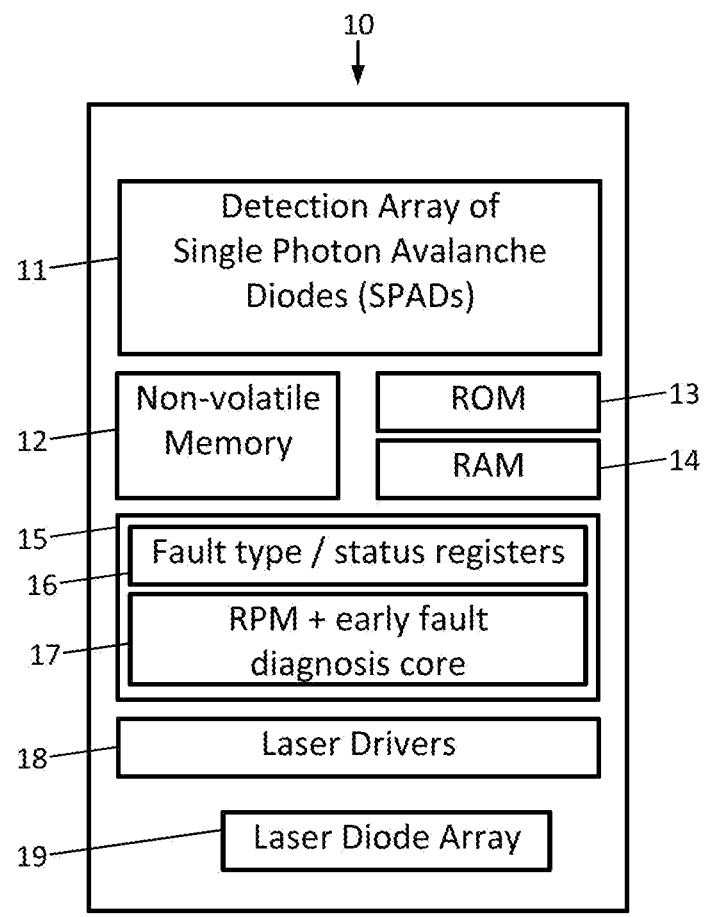
FIG. 1 is a single integrated circuit for determining rotary speed of a device, such as a motor, as well as for detecting early faults with the device, utilizing time of flight ranging technology.

Now described with reference to FIG. 1 is an integrated circuit (IC) chip 10 including rotary speed measurement (in revolutions per minute, RPM) and early fault detection capabilities. The IC 10 includes processing circuitry 15 connected to non-volatile memory 12 for non-volatile data storage, read only memory (ROM) for reading stored data such as program instructions, and random access memory (RAM) for use, such as while executing the rotary speed and fault detection functions described herein. The IC 10 also includes laser drivers 18 for driving an array of laser diodes 19, and an array of single photon avalanche diodes (SPADs) 11. The processing circuitry 15 includes a rotary speed and early fault detection core 17, and registers 16 in which to store fault and fault types, as well as the detected status of the rotating device (such as an electric motor).

Figure 2:
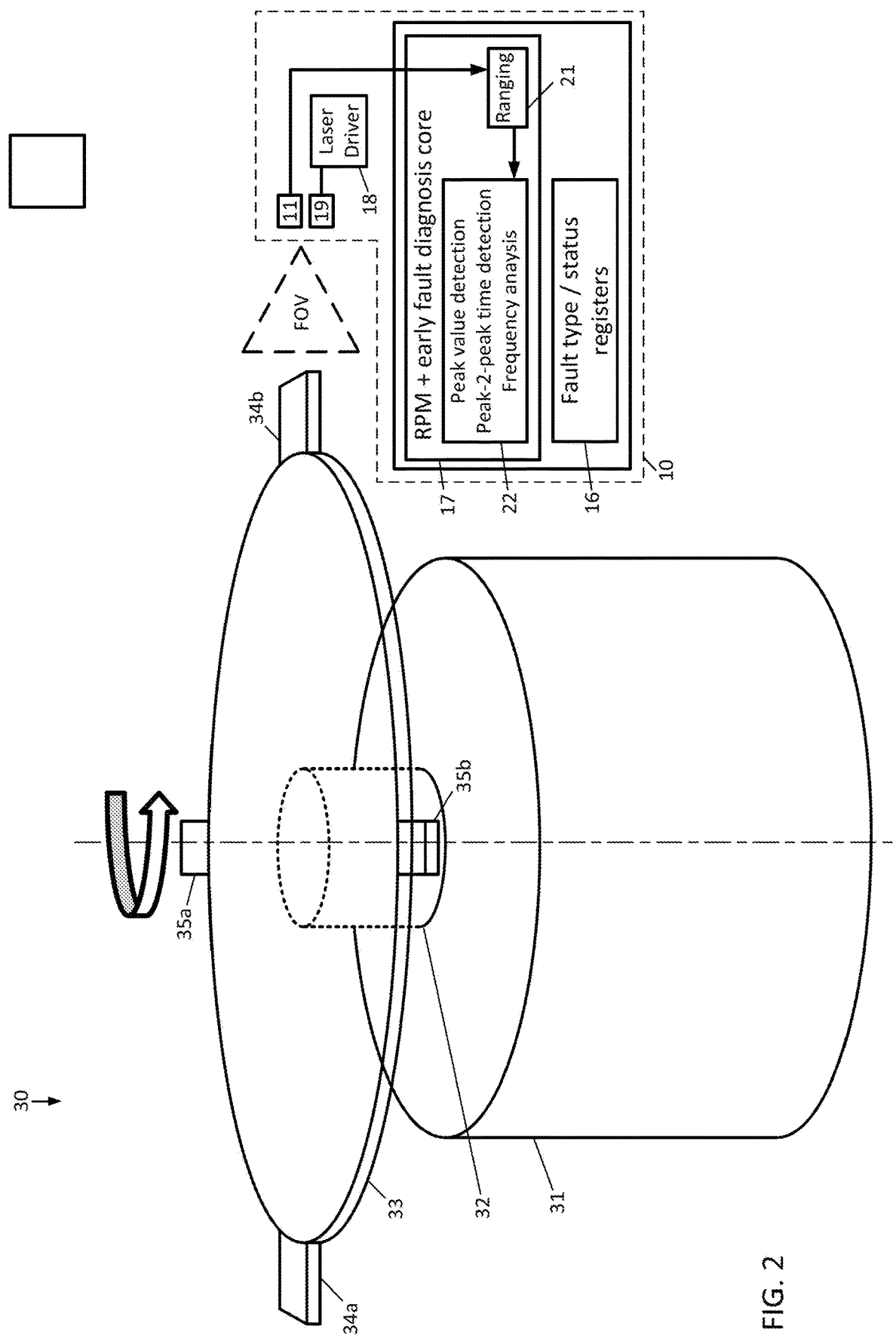
FIG. 2 is a diagrammatical view of a rotary speed detection system including a rotary position disk installed on a rotating shaft and the integrated circuit of FIG. 1 interacting with the rotary position disk so as to determine the rotary speed of the shaft and to detect early faults with the device.

Shown in FIG. 2 is a shaft 32 of a rotating device 31 (i.e., an electric motor), the shaft 32 rotating during operation of the rotating device 31. Affixed to the shaft 32 is a rotary position disk 33 having projections 34-35 extending from its edge. In operation, the laser drivers 18, under control of the processing circuitry 15, cause the laser diodes 19 to emit ranging laser light toward the projections 34-35 of the rotary position disk 33, while the array of SPADs 11 detect ranging laser light that has reflected off the projections 34-35 of the rotary position disk 33 to return to the array of SPADs 11.

The rotary speed and fault detection core 17 is coupled to the array of SPADs 11 and interprets the signals generated thereby. The time of flight ranging performed by the rotary speed and fault detection core 17 may be either direct time of flight ranging or indirect time of flight ranging.

If direct time of flight ranging is to be used, then in operation, the laser drivers 18, under control of the processing circuitry 15, cause the laser diodes 19 to emit pulses of pulses of ranging laser light toward the edges of the projections 34-35 of the rotary position disk 33 according to a ranging frequency (the frequency is that of the emission of the ranging laser light pulses, not of the light itself), while the ranging circuit 21 within the rotary speed and fault detection core 17 measures the time elapsed between emission of a ranging laser light pulse by the laser diodes 19 and detection of the ranging laser light that has reflected off the edges of projections 34-35 and returned to the SPADs 11. Since the distance to the edge of the rotary position disk 33 is known, it is the distance to the edges of the projections 34-35 that is of interest. Since the speed of light is known, by multiplying the elapsed time by the speed of light and dividing by two, the distance between the IC 10 and the projections 34-35 can be determined.

If indirect time of flight ranging is to be used, then in operation, the laser drivers 18, under control of the processing circuitry 15, continuously modulate the laser diodes 19 to emit sinusoidal laser light toward the edges of the projections 34-35 of the rotary position disk 33, while the ranging circuit 21 within the rotary speed and fault detection core 17 compares the phase difference between the reflected sinusoidal laser light and the emitted sinusoidal laser light, and from this phase difference, calculates the distance to the projections 34-35 of the rotary position disk 33.

Note that the time of flight ranging performed by the IC 10 has sufficient resolution to differentiate the distance to the outer edge of the rotary position disk 33 from the distance to the edge of the projections 34 and 35, as well as to differentiate the distance to the projections 34 from the distance to the projections 35. In addition, the time of flight ranging performed by the IC 10 has a sufficient ranging frequency such that the differentiation between these distances can be performed over the operational range of rotation of the shaft 32 of the device 31.

An analysis block 22 within the rotary speed and fault detection core 17 determines from the output of the ranging circuit 21 the peak values (e.g., peak distances between the SPADs 11 and projections 34-35) and then determines the elapsed time between the peaks. Since the number of projections 34-35 is known and the diameter of the shaft 32 is known, from the elapsed time between the peaks, the speed of the shaft 32 in revolutions per minute (RPM) can be determined by the analysis block 22, and output to other components of the IC 10 or via an output to an external component. In addition, since the projections 34-35 may be arranged to each extend from the rotary position disk 33 at a same angle (for example, extending directly outward in the same plane as the rotary position disk 33), if the detected distances to the projections 34-35 vary (meaning that the peaks vary in magnitude) as determined by the analysis block 22, this means that the shaft 32 is wobbling or rotating off center, indicating early failure (considered to be early because the shaft 32 is still rotating, and therefore the failure has not yet become catastrophic). Therefore, in this instance, the analysis block 22 may store this instance of early failure in the status registers 16. In addition, or in the alternative, the analysis block 22 may perform frequency analysis on the peak values (where the peaks vary in magnitude), from this frequency analysis determine the type of early failure that has been detected, and then store this failure type in the status registers 16.

Figure 3:
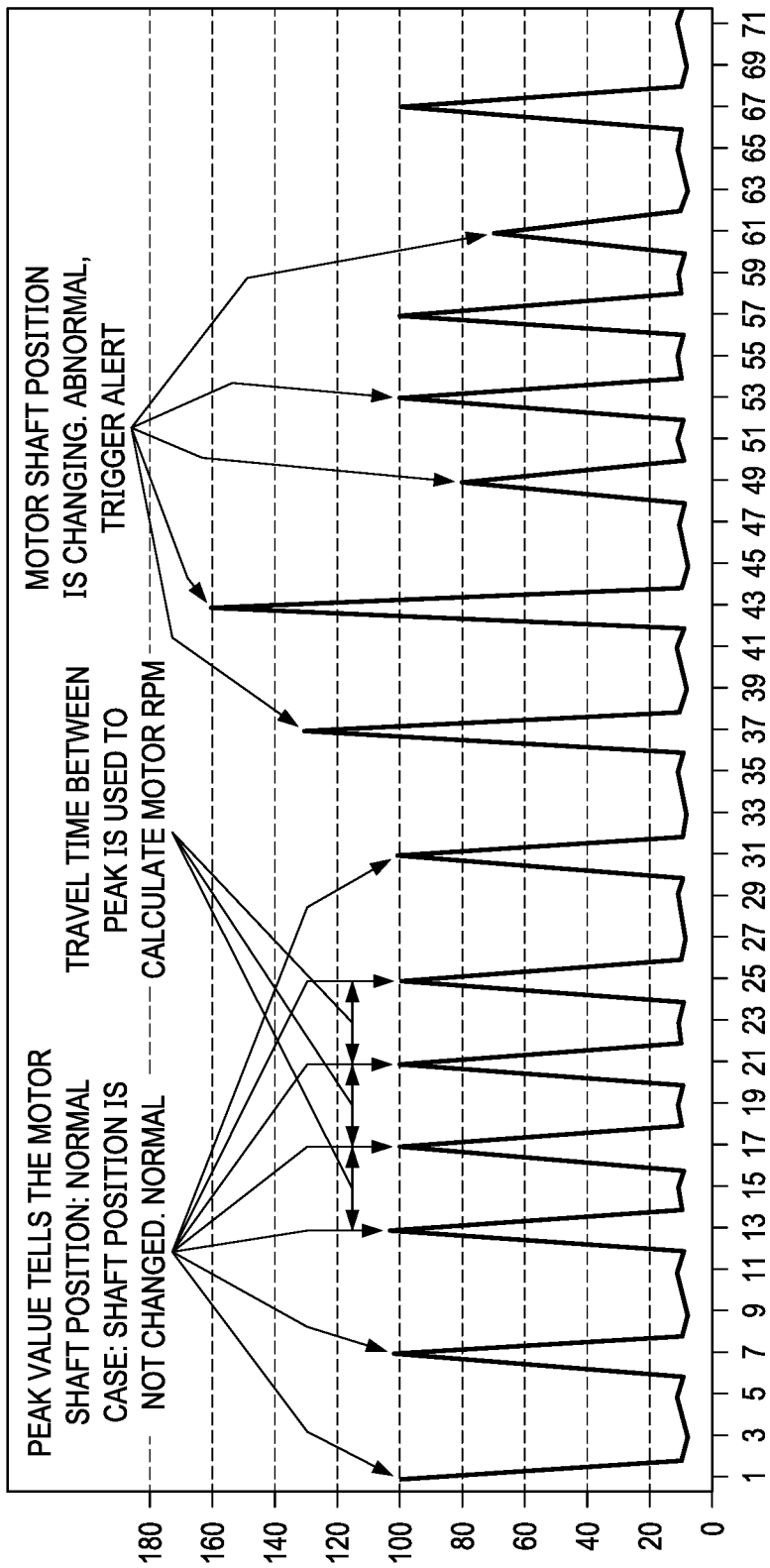
FIG. 3 is a graph illustrating how to interpret the ranging data acquired by the integrated circuit of FIG. 1 to differentiate between normal operation and abnormal operation indicating an early fault.

Shown in FIG. 3 is a graph illustrating sample peak detected values across successive samples. Note that between sample numbers 0 and 35, the detected peaks have a same magnitude, indicating that the shaft 32 is not wobbling or rotating off center, indicating a lack of failure. Also note that since the sampling frequency is known, the time between peaks is easily determined to enable calculation of rotational speed of the shaft 32, for example by averaging the measurement of time between peaks over a range of samples.

Now, note that between sample numbers 35 and 69, the detected peaks do not have a same magnitude, indicating that the shaft 32 is wobbling or rotating off center, meaning that the rotating device 31 is experiencing an early failure. Therefore, in this scenario, the analysis block 22 would have detected the early failure due to the difference in magnitude between the detected peaks, and would store the occurrence of the failure and/or the failure type in the status registers 16.

Figure 4:
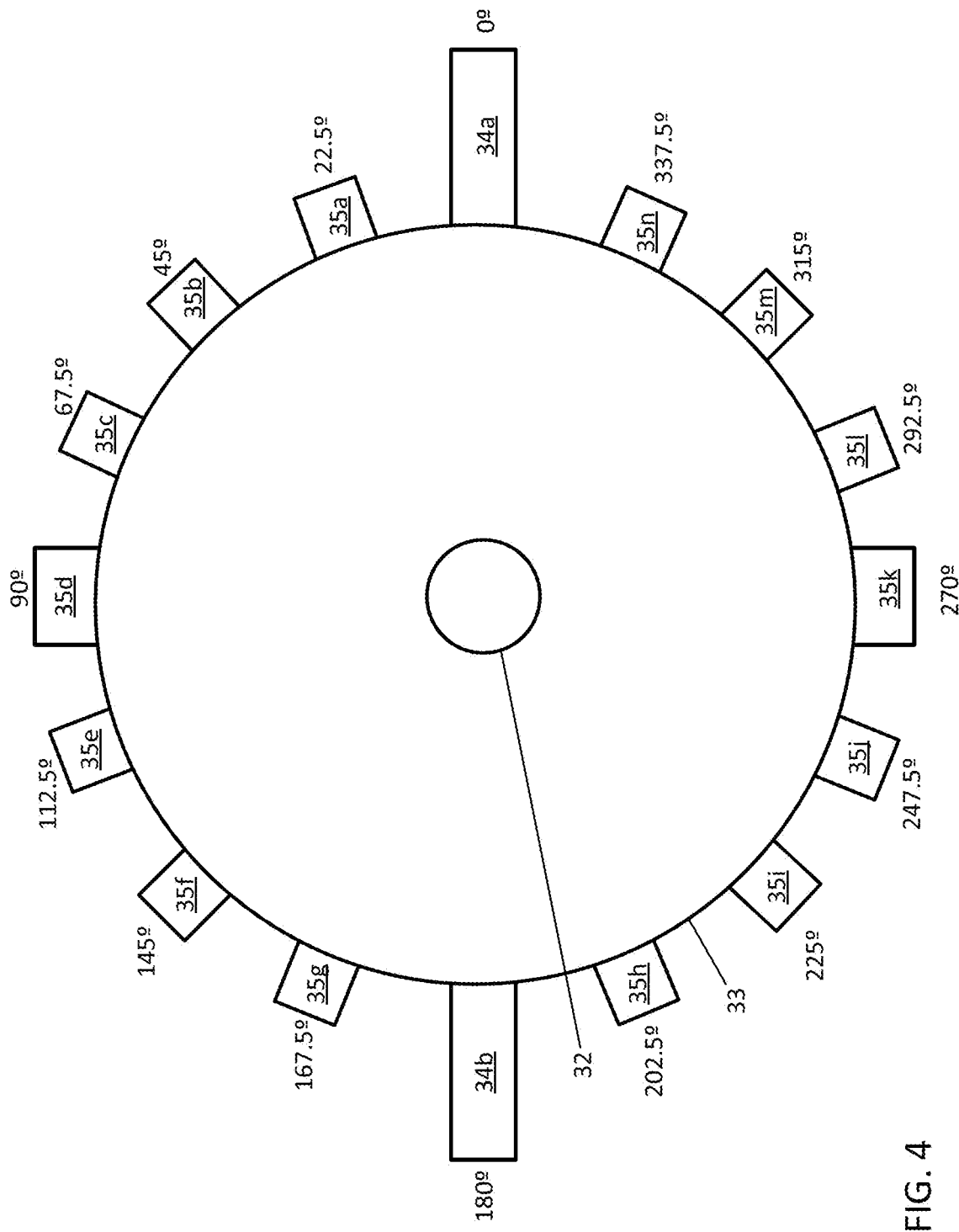
FIG. 4 is a top view of a first embodiment of the rotary position disk of FIG. 2.

One potential configuration for the projections 34-35 about the rotary position disk 33 is now described with reference to FIG. 4 showing a top-down view of the rotary position disk 33. Here, it can be seen that the rotary position disk 33 has two projections 34a and 34b located 180° apart from one another about the perimeter of the rotary position disk 33.

In addition, the rotary position disk 33' has seven projections 35a-35g positioned about a first hemisphere of the perimeter of the rotary position disk 33 between projections 34a and 34b. The projection 35d is located at 90° from both the projections 34a and 34b about the perimeter of the rotary position disk 33. Considering the projection 34a to be at 0° and the projection 34b to be at 180°, projection 35a is at 22.5°, projection 35b is at 45°, projection 35c is at 67.5°, projection 35e is at 112.5°, projection 35f is at 145°, and projection 35g is at 167.5°.

The rotary position disk has seven projections 35h-35n positioned about a second hemisphere of the perimeter of the rotary position disk 33 between projections 34a and 34b. The projection 35k is located at 270° from both the projections 34a and 34b about the perimeter of the rotary position disk 33. Considering the projection 34a to be at 0° and the projection 34b to be at 180°, projection 35h is at 022.5°, projection 35i is at 225°, projection 35j is at 247.5°, projection 35l is at 292.5°, projection 35m is at 315°, and projection 35n is at 337.5°.

The maximum lengths of projections 34a and 34b are equal. The maximum lengths of projections 35a-35n are equal. However, the maximum length of projections 34a-34b is greater than the maximum length of projections 35a-35n.

Those of skill in the art of time of flight sensing will appreciate that time of flight sensing systems (each comprised of a combination of one or more laser diodes, one or more SPADs, a driver for the laser diodes, and processing circuitry) have a maximum ranging frequency, which is the maximum frequency at which they can produce new ranging values. Therefore, with this understanding, those of skill in the art will appreciate that the maximum rotational speed of the shaft 32 detectable by a given time of flight ranging system for a given rotary position disk 33 with a given number of projections is limited by the maximum ranging frequency of that given time of flight ranging system. Therefore, those of skill in the art will understand that the greater the number of projections, the lower the maximum detectable rotational speed of the shaft 32.

As a consequence, the IC 10 may be operable in a low speed detection mode where laser light reflected off all projections 34a-34b, 35a-35n is received and analyzed. Since the ranging circuit 21 is resolving sixteen detections per full rotation of the shaft, this low speed detection mode provides particularly accurate detection of early failures, yet is limited in terms of maximum detectable rotational speed of the shaft 32 compared to a scenario where fewer projections are present or detected.

The IC 10 may also be operable in a high speed detection mode where only laser light reflected off the projections 34a and 34b is received and analyzed. Therefore, since the ranging circuit 21 is resolving two detections per full rotation of the shaft 32, as opposed to resolving sixteen detections per full rotation of the shaft, this high speed detection mode permits detection of higher rotational speeds of the shaft 32 than the low speed detection mode.

This difference between high and low speed detection modes can be seen in FIG. 5A-5B, for a case where the rotary position disk 33 has four projections, namely projections 34a-34b and 35a-35b, such as shown in FIG. 2. Projections 34a-34b in this example have a greater maximum length than projections 35a-35b. Projections 35a-35b are used for low speed detection while projections 34a-34b are used for high speed detection, and it can be seen that the distance to projections 35a-35b is longer than the distance to projections 34a-34b. FIG. 5A illustrates high and low speed detection modes for the case where there is no early failure, while FIG. 5B illustrates high and low speed detection modes for the case where an early failure has been detected.

Figure 6:
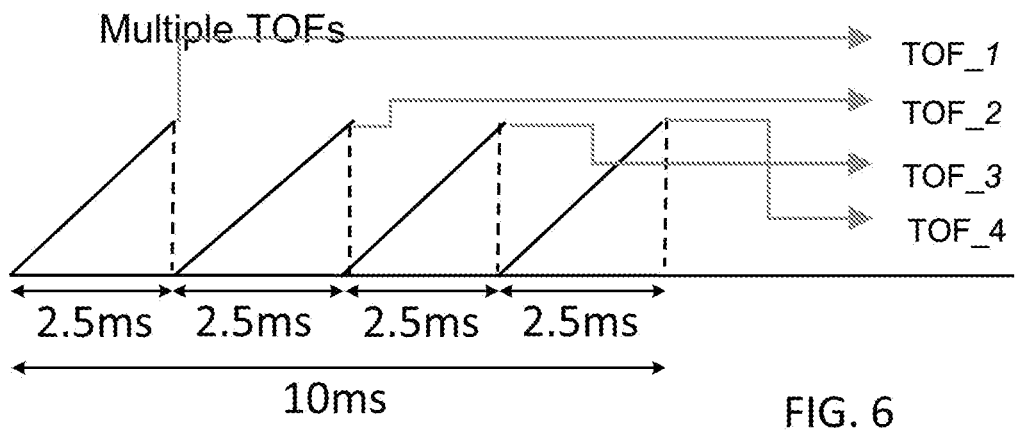
FIG. 6 is a graph showing how multiple time of flight ranging systems incorporated within the integrated circuit of FIG. 1 may be used so as to permit determination of very high rotary speeds of the shaft.

As explained, each time of flight ranging system has a maximum ranging frequency. Therefore, different ones of laser diodes 19, SPADs 11, and laser drivers 18 may be utilized as separate time of flight ranging systems, with the processing circuitry 15 analyzing the output from each separately in parallel. As an example, there may be four such time of flight ranging systems within the IC 10, with the firing (activation) of a different time of flight ranging system occurring every 2.5 ms, which increases the maximum detectable rotational speed of the shaft 32 by a factor of four in both low speed detection mode and high speed detection mode. Therefore, for each additional time of flight ranging system within the IC 10, the maximum detectable rotational speed of the shaft 32 increases (e.g., five time of flight ranging systems increases the maximum detectable rotational speed of the shaft 32 by five, six time of flight ranging systems increases the maximum detectable rotational speed of the shaft 32 by six, etc). Sample timing for an embodiment in which the IC 10 has four time of flight ranging systems, with a different time of flight ranging system being fired every 2.5 systems, is shown in FIG. 6.

Figure 7:
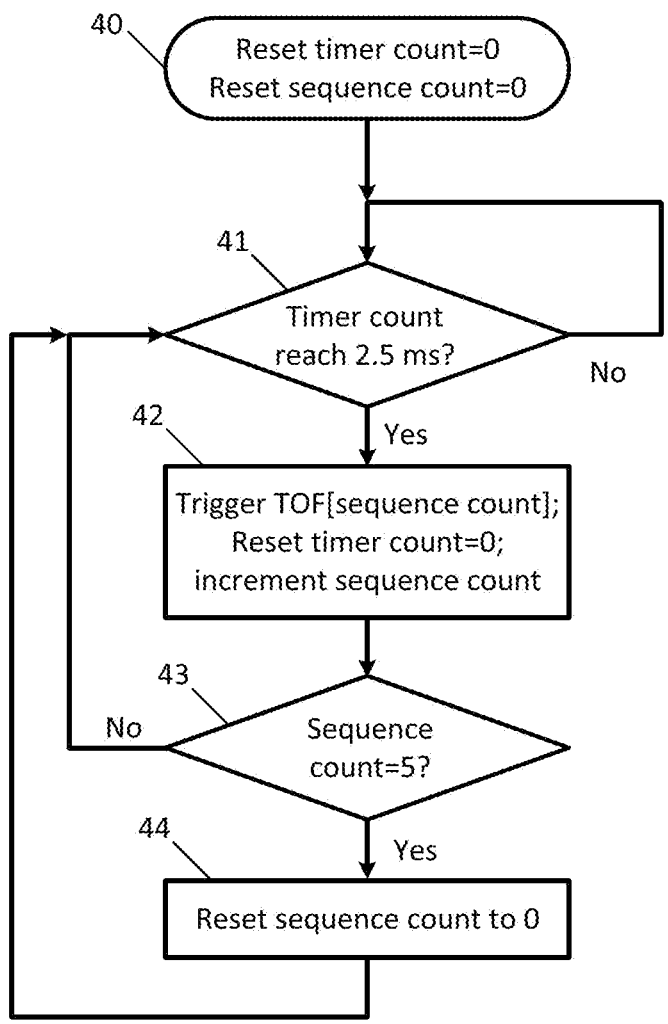
FIG. 7 is a flowchart showing operation of the integrated circuit of FIG. 1 when utilizing multiple time of flight ranging systems according to the mode of operation shown in the graph of FIG. 6.

Synchronous operation of the different time of flight ranging systems by the processing circuitry 15 and laser drivers 18 is perhaps best understood with reference to the flowchart of FIG. 7. Operation includes a timer, and a sequence counter (indicating which of the time of flight ranging systems is being activated). To start, the timer and sequence counter are both reset to zero (Block 40). Once the timer has reached 2.5 ms (Block 41), the time of flight ranging system of the current sequence count is triggered, the timer is reset, and the sequence count is incremented (Block 42).

If the sequence count is not equal to one greater than the maximum sequence count, which here is five (meaning that the maximum sequence count in this example is four), then Block 41 is returned to (Block 43); however, if the sequence count is now equal to one more than the maximum sequence count (Block 43), then the sequence count is reset to zero (Block 44), and Block 41 is returned to.

Figure 8:
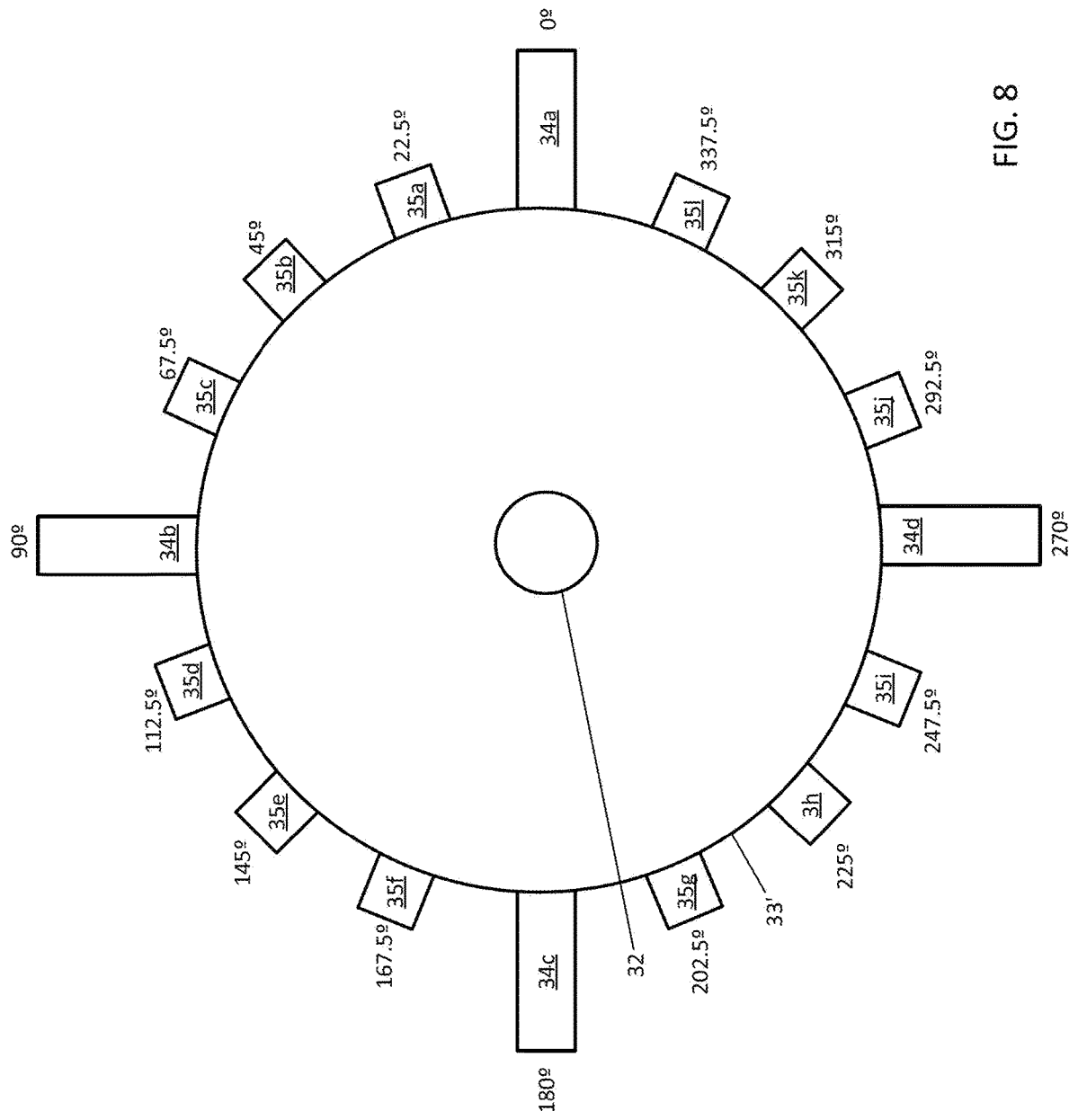
FIG. 8 is a top view of a second embodiment of the rotary position disk of FIG. 2.

Another potential configuration for the projections 34-35 about the rotary position disk 33' is now described with reference to FIG. 8 showing a top-down view of the rotary position disk 33'. Here, it can be seen that the rotary position disk 33' has four projections 34a-34d located 90° apart from one another about the perimeter of the rotary position disk 33'. Considering the projection 34a to be at 0°, the projection 34b is at 90°, the projection 34c is at 180°, and the projection 34d is at 270°.

In addition, the rotary position disk 33' has three projections 35a-35c positioned about a first quartersphere of the perimeter of the rotary position disk 33' between projections 34a and 34b. The projection 35a is located at 22.5°, the projection 35b is located at 45°, and the projection 35c is located at 67.5°. The rotary position disk 33' has three projections 35d-35f positioned about a second quartersphere of the perimeter of the rotary position disk 33' between projections 34b and 34c. The projection 35d is located at 112.5°, the projection 35e is located at 145°, and the projection 35f is located at 167.5°. The rotary position disk 33' has three projections 35g-35i positioned about a third quartersphere of the perimeter of the rotary position disk 33' between projections 34c and 34d. The projection 35g is located at 202.5°, the projection 35h is located at 225°, and the projection 35i is located at 247.5°. The rotary position disk 33' has three projections 35j-35l positioned about a fourth quartersphere of the perimeter of the rotary position disk 33' between projections 34d and 34a. The projection 35j is located at 292.5°, the projection 35k is located at 315°, and the projection 35l is located at 337.5°. Note that the projections 34a-34d have a greater surface area than projections 35a-35l.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A sensor for an electronic device, the sensor comprising:
  at least one time of flight ranging system configured to determine distances between the sensor and projections extending from a rotating disk attached to a rotating shaft of the electronic device; and
  processing circuitry configured to:
    determine a rotational speed of the rotating shaft from the determined distances between the sensor and the projections extending from the rotating disk by:
      determining peaks in the determined distances between the sensor and the projections extending from the rotating disk; and determining the rotational speed of the rotational shaft based upon elapsed time between successive peaks in the determined distances; and detect a possible failure condition from the determined distances between the sensor and the projections extending from the rotating disk.

2. The sensor of claim 1, wherein the processing circuitry is further configured to store occurrence of the detected early failure in a register.

3. The sensor of claim 1, wherein the processing circuitry is further configured to determine a type of the early failure.

4. The sensor of claim 3, wherein the processing circuitry is further configured to store the type of the early failure in a register.

5. The sensor of claim 1, wherein the sensor is incorporated within a single integrated circuit.

6. A sensor for an electronic device, the sensor comprising:
at least one time of flight ranging system configured to determine distances between the sensor and projections extending from a rotating disk attached to a rotating shaft of the electronic device; and
processing circuitry configured to:
determine a rotational speed of the rotating shaft from the determined distances between the sensor and the projections extending from the rotating disk; and
detect a possible failure condition from the determined distances between the sensor and the projections extending from the rotating disk by:
determining peaks in the determined distances between the sensor and the projections extending from the rotating disk; and
identifying an early failure if the determined distances between the sensor and projections extending from the rotating disk vary.

7. The sensor of claim 6, wherein the processing circuitry is further configured to store occurrence of the detected early failure in a register.

8. The sensor of claim 6, wherein the processing circuitry is further configured to determine a type of the early failure.

9. The sensor of claim 8, wherein the processing circuitry is further configured to store the type of the early failure in a register.

10. The sensor of claim 6, wherein the sensor is incorporated within a single integrated circuit.

11. The sensor of claim 6, wherein the sensor is incorporated within a single integrated circuit.

12. A sensor for an electronic device, the sensor comprising:
a plurality of time of flight ranging systems configured to determine distances between the sensor and projections extending from a rotating disk attached to a rotating shaft of the electronic device; and
processing circuitry configured to:
sequentially trigger the plurality of flight ranging systems;
determine a rotational speed of the rotating shaft from the distances between the sensor and the projections extending from the rotating disk determined by the plurality of flight ranging systems; and
detect a possible failure condition from the distances between the sensor and the projections extending from the rotating disk determined by the plurality of flight ranging systems.

13. The sensor of claim 12, wherein the processing circuitry is further configured to store occurrence of the detected early failure in a register.

14. The sensor of claim 12, wherein the processing circuitry is further configured to determine a type of the early failure.

15. The sensor of claim 14, wherein the processing circuitry is further configured to store the type of the early failure in a register.

16. A method, comprising:
Determining distances to projections extending from a rotating disk attached to a rotating shaft of an electronic device;
determining a rotational speed of the rotating shaft from the determined distances to the projections extending from the rotating disk; and
detecting whether the electronic device is undergoing an early failure from the determined distances to the projections extending from the rotating disk by:
determining peaks in the determined distances to the projections extending from the rotating disk; and
determining that the electronic device is undergoing an early failure if the determined distances to the projections extending from the rotating disk vary.

17. A method, comprising:
determining distances to projections extending from a rotating disk attached to a rotating shaft of an electronic device; and
determining a rotational speed of the rotating shaft from the determined distances to the projections extending from the rotating disk by:
determining peaks in the determined distances to the projections extending from the rotating disk; and
determining the rotational speed of the rotational shaft based upon elapsed time between successive peaks in the determined distances; and
detecting whether the electronic device is undergoing an early failure from the determined distances to the projections extending from the rotating disk.

18. A sensor for an electronic device, the sensor comprising:
at least one time of flight ranging system configured to determine distances between the sensor and projections extending from a rotating disk attached to a rotating shaft of the electronic device; and
processing circuitry configured to determine a rotational speed of the rotating shaft from the determined distances between the sensor and the projections extending from the rotating disk by:
determining peaks in the determined distances between the sensor and the projections extending from the rotating disk; and
determining the rotational speed of the rotational shaft based upon elapsed time between successive peaks in the determined distances.

19. The sensor of claim 18, wherein the sensor is incorporated within a single integrated circuit.

20. A system for detecting rotational speed and early failures of an electronic device, the system comprising:
a rotating disk affixed to a rotating shaft of the electronic device, the rotating disk having projections extending from a periphery thereof, wherein a subset of the projections have a greater surface area than a remainder of the projections;
at least one time of flight ranging system configured to determine distances to the projections extending from the rotating disk; and
processing circuitry configured to:

determine a rotational speed of the rotating shaft from the determined distances to the projections extending from the rotating disk; and detect whether the electronic device is undergoing an early failure from the determined distances to the projections extending from the rotating disk.

21. The system of claim 20, wherein the projections extend parallel to a plane of the rotating disk.

22. The system of claim 20, wherein the system is operable in a high speed detection mode in which the at least one time of flight ranging system determines the distances to the subset of the projections having the greater surface area and not to the remainder of the projections.

23. The system of claim 22, wherein the system is also operable in a low speed detection mode in which the at least one time of flight ranging system determines the distances to both the subset of the projections having the greater surface area as well as the remainder of the projections.

24. The system of claim 20, wherein the subset of projections includes at least two projections having a greater surface area than a remainder of the projections.

25. The system of claim 20, wherein the subset of projections includes at least four projections having a greater surface area than a remainder of the projections.

26. A sensor for an electronic device, the sensor comprising:

a plurality of time of flight ranging systems configured to determine distances between the sensor and projections extending from a rotating disk attached to a rotating shaft of the electronic device; and processing circuitry configured to:

sequentially trigger the plurality of flight ranging systems; and determine rotational speed of the rotating shaft from the distances between the sensor and the projections extending from the rotating disk determined by the plurality of flight ranging systems.

27. The sensor of claim 26, wherein the sensor is incorporated within a single integrated circuit.

* * * * *